United States Patent
Overfield et al.

(10) Patent No.: US 12,099,353 B2
(45) Date of Patent: Sep. 24, 2024

(54) SYSTEMS AND METHODS FOR CONTROLLING A TRAILER SEPARATELY FROM A VEHICLE

(71) Applicant: Toyota Motor Engineering & Manufacturing North America, Inc., Plano, TX (US)

(72) Inventors: Gregg J. Overfield, Canton, MI (US); Paul Timothy Fanson, Howell, MI (US); Derek S. Caveney, Plymouth, MI (US); Mehmet Ali Guney, Mountain View, CA (US); Stephen L Robertson, Surprise, AZ (US); Miles J. Johnson, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 101 days.

(21) Appl. No.: 17/585,761

(22) Filed: Jan. 27, 2022

(65) Prior Publication Data
US 2023/0236593 A1    Jul. 27, 2023

(51) Int. Cl.
*G05D 1/00* (2024.01)
*B60W 10/04* (2006.01)
(Continued)

(52) U.S. Cl.
CPC ......... *G05D 1/0016* (2013.01); *G05D 1/0038* (2013.01); *B60W 10/04* (2013.01);
(Continued)

(58) Field of Classification Search
CPC .. G05D 1/0016; G05D 1/0038; G05D 1/0225; B60W 2556/65; B60W 10/04;
(Continued)

(56) References Cited

U.S. PATENT DOCUMENTS

| 9,493,187 B2 | 11/2016 | Pilutti et al. |
| 10,234,868 B2 | 3/2019 | Lavoie et al. |

(Continued)

FOREIGN PATENT DOCUMENTS

| DE | 102020103905 A1 * | 8/2021 |
| EP | 2774828 B1 | 9/2016 |

(Continued)

OTHER PUBLICATIONS

Rottkamp Lukas, Verfahren zum ferngesteuerten Betreiben eines Ziel-Kraftfahrzeugs, Steuereinrichtung, und Controller-Kraftfahrzeug, Aug. 19, 2021, Audi AG, Human Aided Machine Translation.*

(Continued)

*Primary Examiner* — Hunter B Lonsberry
*Assistant Examiner* — Helen Li
(74) *Attorney, Agent, or Firm* — Christopher G. Darrow; Darrow Mustafa PC

(57) ABSTRACT

Systems, methods, and other embodiments described herein relate to controlling a trailer without the presence of a physical connection. In one embodiment, a method includes in response to receiving a signal to initiate hitchless maneuvering of a trailer separately from a controlling vehicle, acquiring control inputs to maneuver the trailer from an input device within the controlling vehicle. The method includes communicating, from the controlling vehicle to the trailer, the control inputs to maneuver the trailer. The method includes in response to receiving feedback from the trailer indicating the trailer is within a requested position, sending a control signal to stop the trailer.

20 Claims, 7 Drawing Sheets

(51) Int. Cl.
*B60W 10/18* (2012.01)
*B60W 10/20* (2006.01)

(52) U.S. Cl.
CPC ............. *B60W 10/18* (2013.01); *B60W 10/20* (2013.01); *B60W 2556/65* (2020.02)

(58) Field of Classification Search
CPC ...... B60W 10/18; B60W 10/20; B60W 30/06; B62D 15/028; B62D 15/027
USPC ............................................................ 701/2
See application file for complete search history.

(56) References Cited

U.S. PATENT DOCUMENTS

| | | |
|---|---|---|
| 10,821,972 B2 | 11/2020 | Krekel et al. |
| 2012/0245796 A1 | 9/2012 | Yu et al. |
| 2016/0101811 A1 | 4/2016 | Kyrtsos et al. |
| 2019/0233034 A1 | 8/2019 | Viele et al. |
| 2020/0133259 A1* | 4/2020 | Van Wiemeersch ......................... B60W 50/029 |
| 2022/0334578 A1* | 10/2022 | Raeis Hosseiny ......................... H04M 1/72448 |

FOREIGN PATENT DOCUMENTS

| | | | |
|---|---|---|---|
| EP | 2669124 B1 | 3/2019 | |
| JP | 2005-001656 A | 1/2005 | |
| WO | WO-2018065988 A1 * | 4/2018 | ............... B60D 1/36 |
| WO | WO-2019053017 A1 * | 3/2019 | ............... B60S 9/215 |

OTHER PUBLICATIONS

International Search Report and Written Opinion of the International Searching Authority issued in corresponding International Patent Application No. PCT/US2023/011695, mailed May 17, 2023, 9 pages.

* cited by examiner

SYSTEMS AND METHODS FOR CONTROLLING A TRAILER SEPARATELY FROM A VEHICLE

TECHNICAL FIELD

The subject matter described herein relates, in general, to controlling a trailer without a physical connection to a vehicle, and, more particularly, to improving the task of maneuvering a trailer by providing a human machine interface (HMI) within the vehicle to control trailer movements.

BACKGROUND

Drivers may encounter difficulties when towing a trailer, such as reversing and parking the trailer. To reverse or park a trailer, a driver typically inputs steering controls within the vehicle opposite to how the vehicle itself reverses to have the trailer move in an intended manner. Thus, the driver maneuvers the vehicle using opposing controls to what may be otherwise intuitive, thereby resulting in difficulties with accurately controlling the trailer during such a maneuver. In general, the further awareness is developed by the vehicle about a surrounding environment, the better a driver can be supplemented with information to assist in driving and/or the better an autonomous system can control the vehicle to avoid hazards.

Current approaches exist to simplify reversing a trailer, such as assistance systems that guide the driver to input controls, which reduces the trial and error of adjusting the trailer. However, such approaches still involve a physical connection between the trailer and the vehicle, resulting in the driver attempting to translate movements of the vehicle into reverse movements of the trailer while also perceiving the surroundings.

SUMMARY

Example systems and methods disclosed herein relate to improving control of a trailer. As previously noted, a physical connection between a vehicle and a trailer results in difficulty maneuvering when performing reversing maneuvers. For example, reversing the trailer involves moving the vehicle opposite to the trailer to achieve a proper trajectory for some maneuvers. Therefore, the physical connection between the vehicle and trailer makes reversing a trailer feel unnatural to a driver.

Therefore, in one embodiment, a system is disclosed that improves controlling a trailer by removing the presence of a physical connection and providing the driver with an easier way to control the movements of the trailer through the use of a human machine interface (HMI) within the vehicle such as the steering wheel, a knob, touch screen, or the like. Further, in one approach, the driver can control the movements of the trailer through the use of a remote device, such as a phone, remote control, or the like. Eliminating the physical connection between the vehicle and trailer allows for the driver to maneuver the trailer also independently of the vehicle. In one approach, the trailer is able to move freely, without the need for a physical connection, by selectively activating at least one front wheel in addition to rear wheels of the trailer. In one approach, a driver initiates trailer maneuvering from inside the vehicle and then using an input device of the vehicle, such as the steering wheel to independently control the vehicle. Initiating trailer maneuvering establishes a wireless connection between the vehicle and trailer and disconnects any physical connection then-existing between the vehicle and trailer. When the driver initiates trailer maneuvering, the vehicle remains stationary and separated from the trailer, thereby avoiding the awkward mirrored control inputs when directly controlling the trailer through a physical connection. Instead, the vehicle communicates movements to the trailer according to maneuvers received via an electronic input device, such as driving inputs of the vehicle (e.g., a steering wheel, a brake pedal, an accelerator pedal, and so on).

The trailer receives the control inputs via the wireless connection and translates the control inputs into specific controls for operating the trailer that cause the trailer to move in accordance with the defined movements. Accordingly, the trailer is capable of reversing, accelerating, braking, steering, and the like. During the maneuvering of the trailer, the vehicle receives feedback from trailer sensors regarding the movements of the trailer. The feedback may be in the form of images or video, which provides, for example, real-time footage of the trailer's movements. The feedback informs subsequent trailer maneuvers to move the trailer into a desired position. When the trailer is in the desired position, the system disengages trailer maneuvering by sending a stop request to the trailer. In this way, the system improves maneuvering of the trailer by facilitating an overall driver experience when reversing a trailer by providing a wireless control mechanism to simplify maneuvering the trailer while the trailer is not physically connected with the vehicle.

In one embodiment, a system is disclosed. The system includes one or more processors and a memory communicably coupled to the one or more processors. The memory stores a control module including instructions that, when executed by the one or more processors, cause the one or more processors to, in response to receiving a signal to initiate hitchless maneuvering of a trailer separately from a controlling vehicle, acquire control inputs to maneuver the trailer from an input device within the controlling vehicle. The control module includes instructions to communicate, from the controlling vehicle to the trailer, the control inputs to maneuver the trailer. The control module includes instructions to, in response to receiving feedback from the trailer indicating the trailer is within a requested position, send a control signal to stop the trailer.

In one embodiment, a non-transitory computer-readable medium including instructions that when executed by one or more processors cause the one or more processors to perform one or more functions is disclosed. The instructions include instructions to, responsive to receiving a signal to initiate hitchless maneuvering of a trailer separately from a controlling vehicle, acquire control inputs to maneuver the trailer from an input device within the controlling vehicle. The instructions include instructions to communicate, from the controlling vehicle to the trailer, the control inputs to maneuver the trailer. The instructions include instructions to responsive to receiving feedback from the trailer indicating the trailer is within a requested position, send a control signal to stop the trailer.

In one embodiment, a method is disclosed. In one embodiment, the method includes, in response to receiving a signal to initiate hitchless maneuvering of a trailer separately from a controlling vehicle, acquiring control inputs to maneuver the trailer from an input device within the controlling vehicle. The method includes communicating, from the controlling vehicle to the trailer, the control inputs to maneuver the trailer. The method includes in response to receiving feedback from the trailer indicating the trailer is within a requested position, sending a control signal to stop the trailer.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
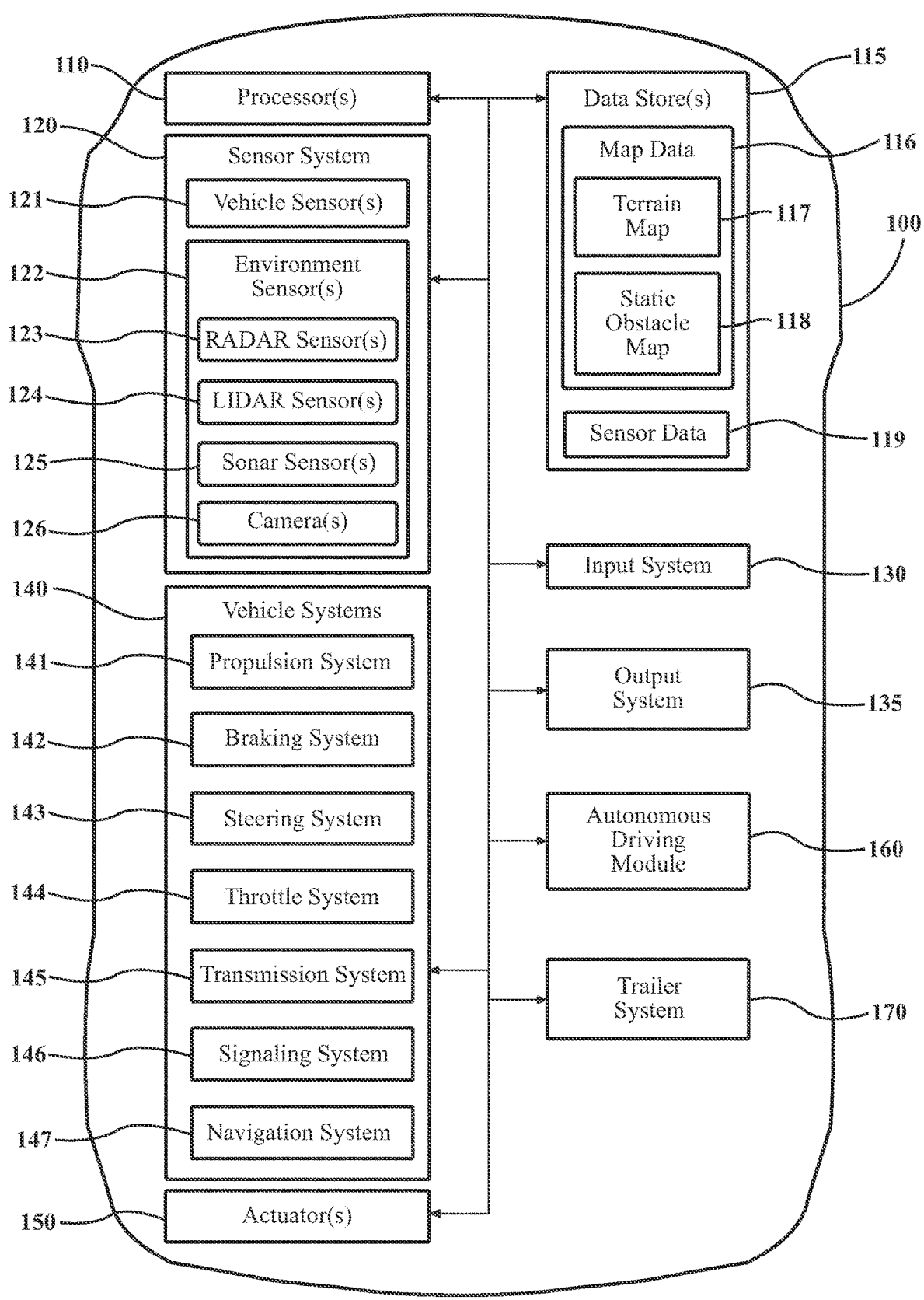
FIG. 1 illustrates one embodiment of a vehicle within which systems and methods disclosed herein may be implemented.

Systems, methods, and other embodiments associated with improving vehicle control over trailer maneuvering by providing the driver with an improved way to control the movements of the trailer through the use of a human machine interface (HMI) within the vehicle are disclosed herein. As previously noted, reversing a trailer while it is physically connected to a vehicle presents difficulties for drivers. When a driver reverses a trailer while it is physically connected to the vehicle, the driver maneuvers the vehicle to control the trailer using opposing controls to what may be otherwise intuitive. For example, if the driver wants the trailer to reverse to the left, the driver needs to turn the steering wheel to the right to move the trailer to the left when reversing. Further, when the driver maneuvers a trailer into a parking spot, difficulties arise with aligning the trailer properly within the boundaries of the parking spot since it is difficult to see and control the movements of the trailer from within the vehicle.

Therefore, in one embodiment, a system is disclosed that improves controlling a trailer by disconnecting a physical connection and providing the driver with an improved way to control the movements of the trailer. The driver can use a human machine interface (HMI) within the vehicle such as the steering wheel, a knob, touch screen, or the like to control the trailer. The driver can also use a remote device, such as a phone, remote control, or the like to control the trailer. Disconnecting the vehicle and trailer allows for the driver to maneuver the trailer independently of the vehicle. In this way, the driver focuses on controlling the movements of the trailer without also controlling and considering the movements of the vehicle. In one or more arrangements, the trailer moves freely, without the need for a physical connection, by activating a front mobility component such as, for example, a front wheel or gyroscope. The mobility component may drop down from a retracted position to the ground upon initiating hitchless trailer maneuvering within the vehicle. Activating the front wheel facilitates trailer movement if the trailer typically operates on two rear wheels when connected to the vehicle.

In one approach, a driver initiates hitchless trailer maneuvering from inside the vehicle. Initiating hitchless trailer maneuvering may include using, for example, a touchpad or button within the vehicle specifically tailored to initiate hitchless trailer maneuvering. Then, using an input device of the vehicle, such as the steering wheel, accelerator/braking pedals, a knob, touch screen, or the like, a driver can independently control the trailer. Initiating hitchless trailer maneuvering establishes a wireless connection between the vehicle and trailer and disconnects a physical connection then-existing between the vehicle and trailer. In one embodiment, the physical connection is disconnected by autonomously unlatching a hitch connecting the vehicle and the trailer. In one approach, a driver manually disconnects any physical connection then-existing. In this way, the system improves maneuvering of the trailer by providing a wireless control mechanism to simplify maneuvering the trailer while the trailer is not physically connected with the vehicle.

When the driver initiates hitchless trailer maneuvering, the vehicle remains stationary and separated from the trailer, thereby avoiding the awkward mirrored control inputs when directly controlling the trailer through a physical connection. Instead, the vehicle communicates movements to the trailer according to maneuvers received via an electronic input device, such as driving inputs of the vehicle (e.g., a steering wheel, a brake pedal, an accelerator pedal, and so on). For example, when the driver turns the steering wheel to the left, a steering mechanism of the trailer causes the trailer to turn left, and if the driver initiates the brake pedal, the trailer brakes. The vehicle may also communicate speed and acceleration controls to the trailer according to maneuvers received from driving inputs of the vehicle. Therefore, in one approach, the driver maneuvers the trailer as if the driver is maneuvering the vehicle itself.

The trailer receives the control inputs via the wireless connection and translates the control inputs into specific controls for operating the trailer that cause the trailer to move in accordance with the control inputs. Accordingly, the trailer is capable of reversing, accelerating, braking, steering, and the like. Further, the trailer is capable of moving in the forward direction to allow for the driver to adjust the position of the trailer as it reverses into a particular position, such as a parking space. The driver may control whether the trailer is reversing or travelling forward using input controls within the vehicle such as a touch screen or button(s).

While control inputs are communicated to the trailer, the vehicle receives feedback from trailer sensors regarding the movements of the trailer. The feedback is, in one approach, in the form of images or video, which provides, for example, real-time footage of the trailer movements. Displays within the vehicle, such as a heads up display (HUD), augmented reality (AR), a touchscreen, or the like show the real-time footage of the movements of the trailer. The real-time footage informs subsequent trailer maneuvers to move the trailer into a desired position. When the trailer is in a desired position, the system disengages trailer maneuvering by sending a stop request to the trailer. An HMI device (e.g., a touchscreen, a button, etc.) receives manual control inputs from a driver. Alternatively, the system automatically sends the stop request upon the trailer successfully maneuvering in between the boundaries of, for example, a parking space. After trailer maneuvering is disengaged, the vehicle is free to travel without the trailer connected. In this way, the system improves maneuvering of the trailer by facilitating an overall driver experience when reversing a trailer through the use of a wireless control mechanism while the trailer is not physically connected with the vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In one arrangement, the vehicle 100 includes a physical connection point (e.g., a ball) to which a trailer may be attached using, for example, a hitch for towing. In further aspects, the vehicle 100 also includes components that facilitate wireless communications between the vehicle 100 and trailer such as a wireless communication link through which the vehicle 100 links to trailer systems such as signaling systems, braking systems, sensor systems, and so on of the trailer. Accordingly, in various approaches, the vehicle 100 can control the noted systems of the trailer via the wireless communication link and/or acquire information from the systems.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a trailer system 170 that is implemented to perform methods and other functions as disclosed herein relating to improving trailer control from within the vehicle.

Figure 2:
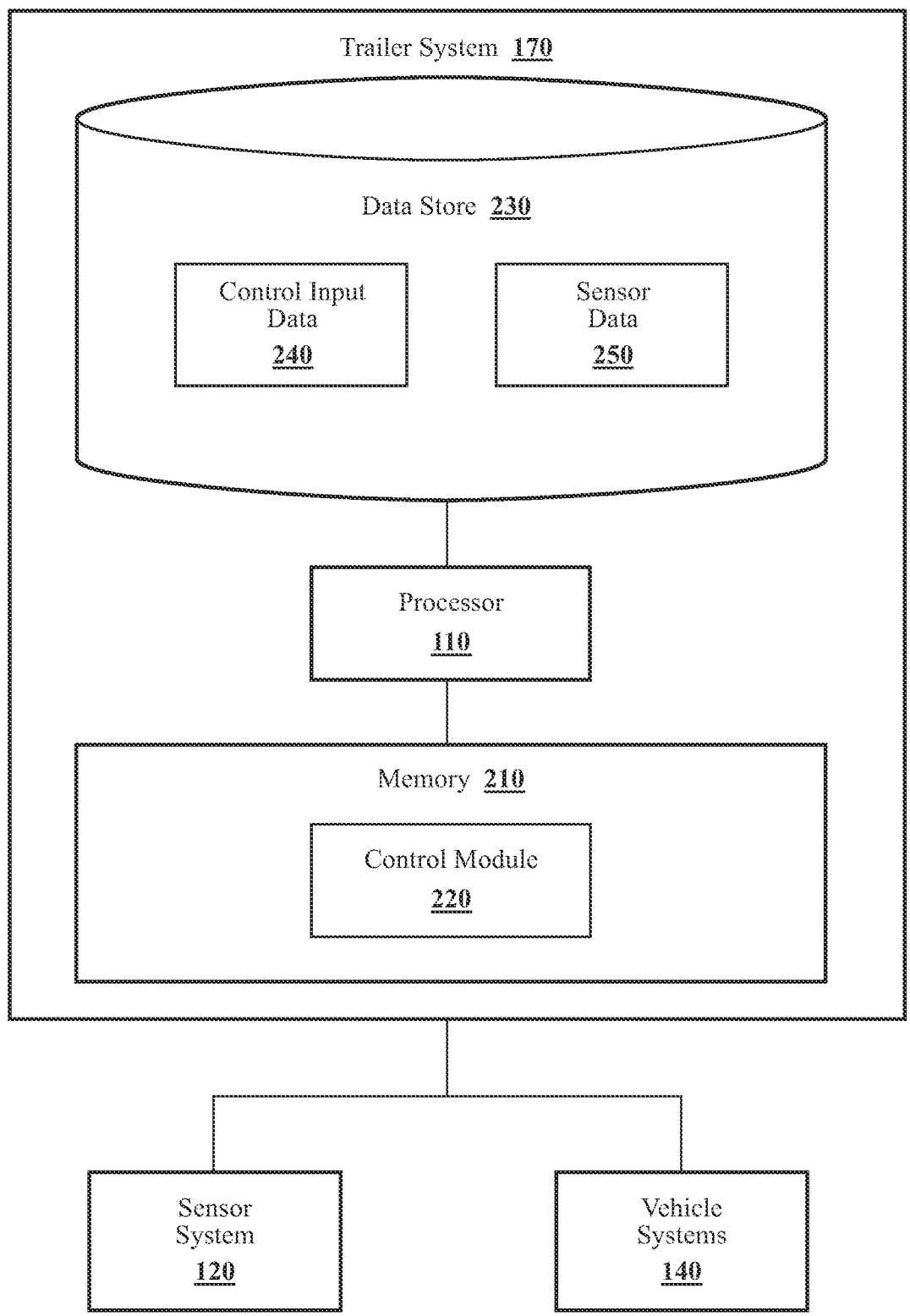
FIG. 2 illustrates one embodiment of a trailer system that is associated with improving vehicle control of trailer maneuvering.

With reference to FIG. 2, one embodiment of the trailer system 170 of FIG. 1 is further illustrated. The trailer system 170 is shown as including a processor 110 from the vehicle 100 of FIG. 1. Accordingly, the processor 110 may be a part of the trailer system 170, the trailer system 170 may include a separate processor from the processor 110 of the vehicle 100, or the trailer system 170 may access the processor 110 through a data bus or another communication path. In one embodiment, the trailer system 170 includes a memory 210 that stores a control module 220. The memory 210 is a random-access memory (RAM), read-only memory (ROM), a hard-disk drive, a flash memory, or other suitable memory for storing the control module 220. The control module 220 is, for example, computer-readable instructions that when executed by the processor 110 cause the processor 110 to perform the various functions disclosed herein.

With reference to FIG. 2, the control module 220 generally includes instructions that function to control the processor 110 to identify control inputs from one or more input devices of the vehicle 100. The control inputs are, in one embodiment, control inputs entered by an occupant (e.g., a driver or a passenger) within the vehicle 100. As provided for herein, the control module 220, in one arrangement, acquires control input data 240 from an input device that includes at least control inputs to maneuver a trailer longitudinally and laterally. Further, the control inputs may control other trailer functions (e.g., trailer lights, parking brakes, trailer speed, etc.) The input device may include an input device such as a steering wheel, a knob, a button, a touchscreen, a brake pedal, an accelerator pedal, and so on.

With reference to FIG. 2, the control module 220 generally includes instructions that function to control the processor 110 to receive data inputs from one or more sensors of the vehicle 100 and a trailer. The inputs are, in one embodiment, observations of one or more objects in an environment proximate to the vehicle 100 and/or other aspects about the surroundings. As provided for herein, the control module 220, in one embodiment, acquires sensor data 250 that includes at least camera images. In further arrangements, the control module 220 acquires the sensor data 250 from further sensors such as a radar 123, a LiDAR 124, and other sensors as may be suitable for identifying vehicles and locations of the vehicles.

Accordingly, the control module 220, in one embodiment, controls the respective sensors to provide the data inputs in the form of the sensor data 250. Additionally, while the control module 220 is discussed as controlling the various sensors to provide the sensor data 250, in one or more embodiments, the control module 220 can employ other techniques to acquire the sensor data 250 that are either active or passive. For example, the control module 220 may passively sniff the sensor data 250 from a stream of electronic information provided by the various sensors to further components within the vehicle 100. Moreover, the control module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

The sensor data 250 may include, for example, information about lane markings, parking space boundaries, and so on. Moreover, the control module 220, in one embodiment, controls the sensors to acquire the sensor data 250 about an area that encompasses 360 degrees about the vehicle 100 and trailer in order to provide a comprehensive assessment of the surrounding environment of the vehicle 100 and trailer. Of course, in alternative embodiments, the control module 220 may acquire the sensor data about a reverse direction alone when, for example, the vehicle 100 is not equipped with further sensors to include additional regions about the vehicle 100 and trailer and/or the additional regions are not scanned due to other reasons.

Moreover, in one embodiment, the trailer system 170 includes a data store 230. In one embodiment, the data store 230 is a database. The database is, in one embodiment, an electronic data structure stored in the memory 210 or another data store that is configured with routines that can be executed by the processor 110 for analyzing stored data, providing stored data, organizing stored data, and so on. Thus, in one embodiment, the data store 230 stores data used by the control module 220 in executing various functions.

In one embodiment, the data store 230 includes control input data 240. For example, the control input data 240 can include control inputs such as steering controls, braking controls, and speed controls. In one arrangement, the data store 230 further includes other information that is used by the control module 220. The discussion will now shift to FIG. 3 to further explain how the control module 220 implements various controls to maneuver a trailer.

Figure 3:
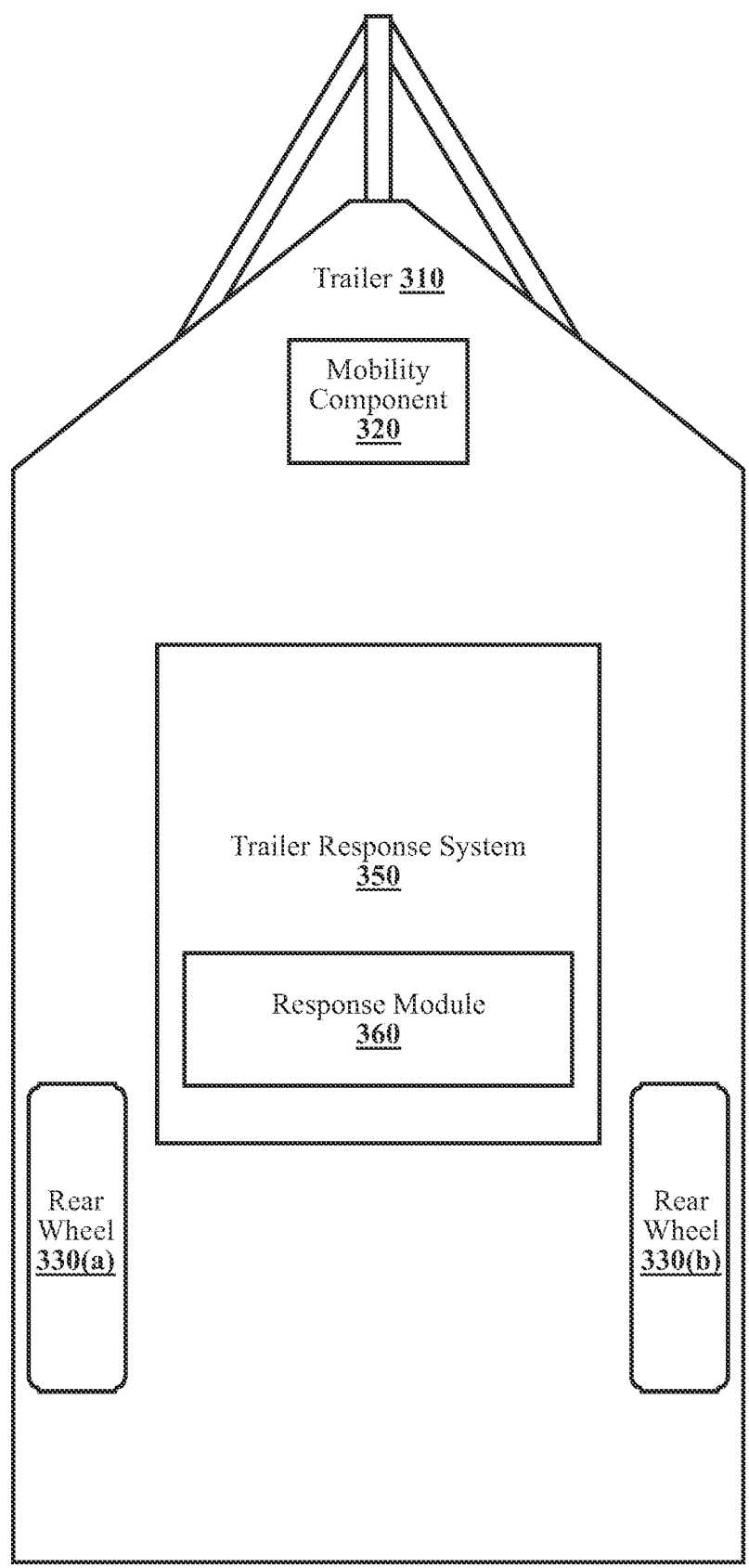
FIG. 3 illustrates one embodiment of a trailer within which systems and methods disclosed herein may be implemented.

With reference to FIG. 3, one embodiment of a trailer 310 is illustrated. As used herein, a "trailer" includes at least two rear wheels 330(*a*) and 330(*b*) and is capable of connecting to a vehicle with a physical connection (e.g., a hitch). In one or more implementations, the trailer 310 has at least one front mobility component 320. The mobility component 320 is, for example, a wheel, gyroscope, or another device capable of facilitating movement of the trailer 310 when disconnected from a towing vehicle. In one embodiment, the mobility component 320 drops down and extends to the ground beneath the trailer 310 upon receiving a signal from the control module 220 or in response to the physical connection between the trailer 310 and the vehicle 100 disconnecting. The trailer 310 includes a trailer response system 350 with a response module 360 that generally functions to execute instructions received from the control module 220 for remotely maneuvering the trailer 310. In one arrangement, the trailer response system 350 also includes a sensor system. The sensor system may include sensors capable of capturing image data and/or other observations of the surroundings of the trailer 310 and information about the trailer 310 itself. The sensors may be, for example, cameras, radars, light detection and ranging sensors (LiDARs), inertial measurement sensors (IMUs), etc. Discussion will now transition back to FIG. 2 to further explain how the control module 220 communicates instructions to the trailer 310.

With reference to FIG. 2, the control module 220, in one embodiment, is further configured to perform additional tasks beyond controlling the respective sensors to acquire and provide the sensor data 250 and beyond acquiring control inputs to identify and communicate the control input data 240. For example, the control module 220 includes instructions that cause the processor 110 to receive a signal from an input device. The control module 220 initiates hitchless maneuvering of the trailer according to the signal. In one embodiment, the controlling vehicle is the vehicle 100, the trailer is the trailer 310, and the input device includes, for example, button(s) and a touch screen device or another HMI device. The control module 220 acquires control input data 240 to identify the signal that initiates hitchless maneuvering, where the HMI generates and provides the signal when an occupant (e.g., a driver or a passenger) of the vehicle 100 manipulates, for example, a button or a touch screen device located in the vehicle 100.

In response to receiving the signal to initiate hitchless maneuvering, the control module 220 identifies whether a wireless connection exists between vehicle 100 and the trailer 310. If a wireless connection does not exist, the control module 220 establishes a wireless connection between the vehicle 100 and the trailer 310. The control module 220 may establish the wireless connection by using a handshake process which includes the control module 220 identifying a beacon transmitted from the trailer 310 and subsequently sending a secured message receivable by the trailer 310.

Further, in response to receiving the signal to initiate hitchless maneuvering, the control module 220 disconnects a physical connection then-existing between the vehicle 100 and the trailer 310. In one embodiment, the control module 220 disconnects a physical connection by autonomously unlatching a hitch connecting the vehicle and the trailer. In a further approach, a driver manually disconnects a physical connection then-existing. Moreover, in response to receiving the signal to initiate hitchless maneuvering, the control module 220 renders the vehicle 100 stationary during trailer maneuvering. In one embodiment, the control module 220 causes the vehicle 100 to remain stationary by parking the vehicle 100 and disabling systems of the vehicle 100 that maneuver the trailer 310 (e.g., braking systems, steering systems, etc.).

The control module 220 identifies control inputs from the input device to cause the trailer 310 to maneuver. In one embodiment, the input device is, for example, a steering wheel, a knob, button(s), and a touch screen device. In one configuration, the input device is a remote device, such as a phone or a remote control. The input device provides, as control inputs, steering controls. Further, the input device may include, as control inputs, brake pedal movements and accelerator pedal movements. The input device may be used to specify which longitudinal direction the trailer 310 moves in (i.e., whether the trailer 310 will move forward or reverse). As such, the control module 220 identifies control inputs by acquiring inputs from an input device.

The control module 220 communicates, from the vehicle 100 to the trailer 310, the control inputs to maneuver the trailer 310 accordingly. In one or more arrangements, the control module 220 translates the control inputs into commands for controlling the trailer. That is, the control module 220 may identify an intent of the control inputs and translate the control inputs into commands that are interpretable by the trailer 310 for inducing movements therein. Moreover, the control module 220, in at least one approach, forms the communication using a particular protocol to encode the commands such that the communication between the system 170 and the trailer 310 are secure from malicious interference. In this way, the trailer system 170 remotely controls the trailer 310 while the vehicle 100 remains stationary.

For example, if an occupant turns the steering wheel or a knob capable of controlling the trailer 310 within the vehicle 100 to the left, the control module 220 communicates a left turn command to the trailer 310. In response, the trailer 310 controls a steering mechanism of the trailer 310 that causes the trailer 310 to turn left to the same degree in which the occupant turns the steering wheel or knob. In one approach, the HMI acquires control inputs responsive to an occupant of the vehicle 100 turning the steering wheel or a knob to the left while simultaneously applying pressure to the accelerator pedal. In response, the trailer 310 steers to the left and accelerates based on the amount the occupant presses the accelerator pedal. In one embodiment, the occupant may use a touch screen device or button(s) to input both speed and steering controls for the processor 110 to communicate.

The control module 220 receives feedback from the trailer 310. The trailer feedback may be displayed to an occupant of the vehicle 100 using a display. The display may be a heads-up display (HUD), an augmented reality (AR) display, or another display device located within the vehicle 100 that can display the feedback from the trailer 310. In any case, the occupant can see how the trailer 310 is responding to control inputs entered through the input device on the display. In one approach, the trailer feedback includes video data and image data retrieved from sensors located on the trailer 310. The sensors may be located on exterior surfaces of the trailer 310 such as to capture an area that encompasses 360 degrees surrounding the trailer 310. For example, the sensors may be located on a rear exterior surface of the trailer 310, on the roof of the trailer 310, or above the rear wheels 330(a) and 330(b) of the trailer 310. The sensors may include cameras that capture real-time image and video data of the surroundings of the trailer 310. The control module 220 receives the real-time image and video data captured by the sensors located on the trailer 310 and displays the real-time image and video data on, for example, a display located within the vehicle 100.

In response to receiving the feedback from the trailer 310, the control module 220 determines whether to disengage hitchless maneuvering of the trailer 310. The control module 220 may automatically determine to disengage hitchless maneuvering of the trailer 310 if the trailer 310 maneuvers into a requested position such as, for example, between the boundaries of a parking space and is laterally centered between the boundaries of the parking space. The control module 220 may automatically determine to disengage hitchless maneuvering of the trailer 310 if the trailer 310 begins to position in a matter that satisfies parking criteria defined by the trailer system 170. For example, the control module 220 can pre-emptively prepare a stop signal to send to the trailer 310 if the trailer 310 becomes positioned between the requested position, the requested position being between the boundaries of a parking space. Moreover, such preemptive action by the control module 220 be combined with a subsequent determination that the trailer 310 is parked between the boundaries of the parking space.

In one embodiment, the control module 220 determines the onset of the trailer 310 positioning to align between the boundaries of a parking space by using the criteria that defines thresholds/conditions associated with the onset. As with other aspects of the trailer system 170, the criteria can be implemented with varying degrees of specificity and characteristics depending on a particular implementation. For example, in one approach, the trailer system 170 defines the criteria as a threshold distance between two solid lines and indicating a magnitude of distance from solid lines of a parking space to trigger a response by the control module 220. It should be appreciated that while the distance threshold is discussed as a binary trigger, a response of the system 170 can include varying tiers (i.e., degrees/combinations) of controls according to distances between solid lines of a parking space once the initial distance threshold is satisfied.

In either case, the control module 220, in one or more embodiments, functions to control the trailer 310 according to the position of the trailer as it moves between the boundaries of a parking space or as it moves to any other requested position. As such, the control module 220, upon determining that the threshold distance satisfies the parking criteria, decides to disengage hitchless maneuvering.

Alternatively, the control module 220 determines whether to disengage hitchless maneuvering of the trailer 310 based on an electronic input from a machine interface controlled by a human driver of the vehicle 100. The machine interface may be an input device. The input device communicates a disengagement request. For example, an occupant may press a button or interact with a touch screen device in a manner that indicates a request to disengage hitchless maneuvering. In response to determining to disengage hitchless maneuvering, the control module 220 sends a control signal to stop the trailer 310 from moving any farther. If, however, the control module 220 determines that hitchless maneuvering should not be disengaged, the control module 220 continues identifying and communicating control inputs to cause the trailer 310 to move accordingly.

Figure 4:
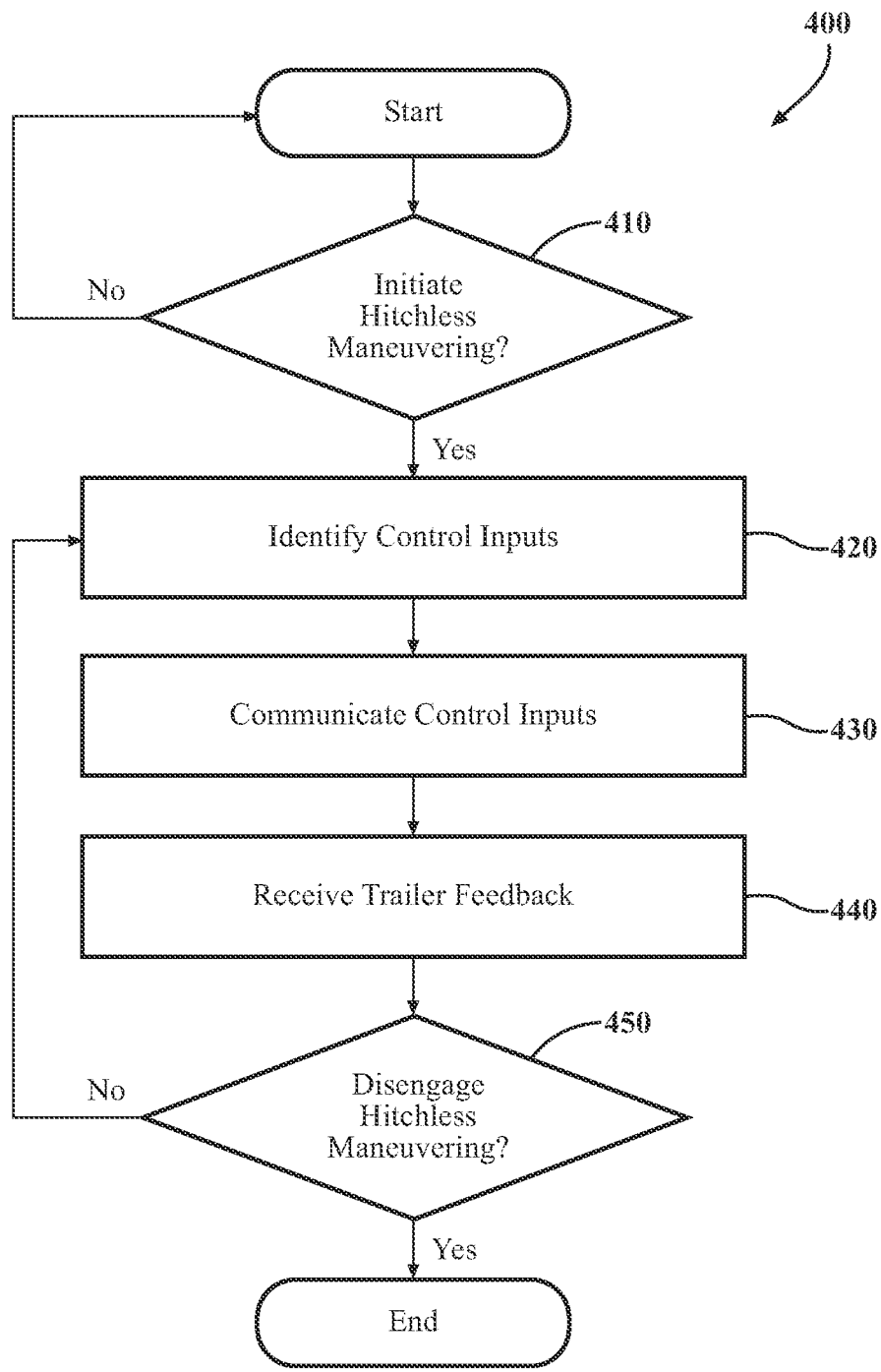
FIG. 4 is a flowchart illustrating one embodiment of a method associated with improving control of trailer maneuvering.

Additional aspects of improving trailer control from within a vehicle will be discussed in relation to FIG. 4. FIG. 4 illustrates a flowchart of a method 400 that is associated with controlling the trailer 310 from the vehicle 100 without a physical connection between the vehicle 100 and the trailer 310. Method 400 will be discussed from the perspective of the trailer system 170 of FIGS. 1, and 2. While method 400 is discussed in combination with the trailer system 170, it should be appreciated that the method 400 is not limited to being implemented within the trailer system 170 but is instead one example of a system that may implement the method 400. Discussion of the method 400 may include discussion of FIG. 3 with respect to how the trailer 310 moves in response to receiving control inputs from the trailer system 170 of FIGS. 1 and 2.

At 410, the control module 220 receives a signal to initiate hitchless maneuvering of a trailer separately from a controlling vehicle. In one embodiment, the controlling vehicle is the vehicle 100, and the trailer is the trailer 310. In one embodiment, the input device includes, for example, button(s) and a touch screen device. The control module 220 acquires control input data 240 to identify the signal that initiates hitchless maneuvering. An occupant (e.g., a driver or a passenger) generates the signal to initiate hitchless maneuvering by engaging with, for example, a button or a touch screen device located in the vehicle 100. An occupant may also generate the signal to initiate hitchless maneuvering by engaging with a remote device, such as a phone or remote control.

In response to receiving the signal to initiate hitchless maneuvering, the control module 220 determines whether a wireless connection exists between the vehicle 100 and the trailer 310 by identifying the presence of a wireless connection. If a wireless connection does not exist between the vehicle 100 and the trailer 310, the control module 220 establishes a wireless connection. For example, the control module 220 may establish the wireless connection by using a handshake process. In one approach, the handshake process includes identifying a beacon transmitted from the trailer 310. The control module 220 recognizes the beacon and attempts to establish a connection by sending a secure message including credentials of the vehicle 100. A wireless connection is successfully established when the trailer 310 receives the secure message from the control module 220 and responds thereto with, for example, a session key or other information in support of the communication link.

In response to receiving the signal to initiate hitchless maneuvering and establishing a wireless connection with the trailer 310, the control module 220 disconnects a physical connection then-existing between the vehicle 100 and the trailer 310 to facilitate movement of the trailer 310 separate from the vehicle 100. In one embodiment, the control module 220 controls disconnecting a physical connection by autonomously unlatching a hitch connecting the vehicle and the trailer. In one approach, a driver may manually disconnect any physical connection then-existing. Moreover, in response to receiving the signal to initiate hitchless maneuvering, the control module 220 renders the vehicle 100 in a stationary position during trailer maneuvering. In one embodiment, the control module 220 causes the vehicle 100 to remain stationary by controlling the vehicle 100 to engage a park function (e.g., a parking selection of a transmission). The control module 220 may further disable control connections of input systems of the vehicle 100 that may act as HMI elements to provide control inputs for maneuvering the trailer 310 (e.g., braking systems, steering systems, etc.).

At 420, the control module 220 identifies control inputs that cause the trailer 310 to maneuver. In one embodiment, the input device is, for example, a steering wheel, a knob, button(s), a touch screen device, etc. In one approach, the input device is, for example, a remote device, such as a phone, remote control, etc. The input device provides, as inputs, steering controls. Further, the input device may include, as inputs, braking controls and steering controls. The input device may be used to specify which longitudinal direction the trailer 310 moves in (i.e., whether the trailer 310 will move forward or reverse). As such, the control module 220 identifies control inputs by acquiring information from an input device.

At 430, the control module 220 communicates the control inputs to the trailer 310 to maneuver the trailer 310 accordingly. In one or more arrangements, the control module 220 translates the control inputs into commands for controlling the trailer. That is, the control module 220 may identify an intent of the control inputs and translate the control inputs into commands that are interpretable by the trailer 310 for inducing movements therein. For example, an occupant may turn the steering wheel or a knob to the right which causes the control module 220 to identify that the intent of the control inputs is to turn the trailer 310 to the right. As such, the control module 220 translates the right turn control input into a command for the trailer 310 to execute. Moreover, the control module 220, in at least one approach, forms the communication using a particular protocol to encode the commands such that the communication between the system 170 and the trailer 310 are secure from malicious interference. In this way, the trailer system 170 is able to remotely control the trailer 310 while the vehicle 100 remains stationary.

An occupant may generate control inputs by interacting with a single input device within the vehicle 100. For example, if an occupant turns the steering wheel or a knob capable of controlling the trailer 310 within the vehicle 100 to the left, the control module 220 communicates a left turn command to the trailer 310. In response, the trailer 310 controls a steering mechanism of the trailer 310 which causes the trailer 310 to turn left to the same degree in which the occupant turns the steering wheel or knob. In one approach, an occupant may generate a speed, longitudinal direction, and steering input all on a touchpad located within the vehicle 100. For example, a touchpad may include interactable virtual buttons or dials that generate control inputs in response to an occupant interacting with the buttons or dials. In one embodiment, the vehicle 100 includes buttons corresponding to various control inputs (i.e., buttons to increase/decrease speed of the trailer 310, buttons to adjust the steering angle of the trailer 310, buttons to specify a longitudinal direction of travel for the trailer 310, etc.). For example, if an occupant interacts with a button to increase the speed of the trailer 310, the control module 220 translates the speed control input into a command for the trailer 310 to execute accordingly. In one configuration, an occupant interacts with a remote device, such as a phone or remote control to generate control inputs. For example, an occupant may generate control inputs, such as the speed, longitudinal direction, and steering controls for the trailer 310 to execute on a mobile application.

In one approach, an occupant of the vehicle 100 may generate control inputs by simultaneously interacting with more than one input device located within the vehicle 100. For example, an occupant may turn the steering wheel or a knob to the left while simultaneously applying pressure to the accelerator pedal. In response, the trailer 310 steers to the left and accelerates based on the amount the occupant presses the accelerator pedal. In one embodiment, the occupant may use a touch screen device to input the speed, longitudinal direction of travel, and steering angle/direction for the trailer 310 to execute. For example, an occupant may use the touchpad to request the trailer 310 to move in the reverse direction at a speed of 2 miles per hour while turning to the left at a 45-degree angle. As such, the control module 220 translates the control inputs received from the touchpad into commands for the trailer 310 to execute such that the trailer 310 reverses at a speed of two miles per hour while turning to the left at a 45-degree angle. Similarly, an occupant may use one or more buttons located in the vehicle 100 simultaneously to generate multiple control inputs for the trailer 310 to execute simultaneously.

At 440, the control module 220 receives trailer feedback. The control module 220 displays the trailer feedback to an occupant of the vehicle 100 using a display. The display may be a heads-up display (HUD), an augmented reality (AR) display, or another display device located within the vehicle 100 that can display the feedback from the trailer 310. In any case, the occupant can see how the trailer 310 is responding to control inputs entered through the input device on the display. In one approach, the trailer feedback includes video data and image data retrieved from sensors located on the trailer 310. The sensors may include cameras, radars, and LiDARs that capture real-time image and video data of the surroundings of the trailer 310. The sensors may be located on exterior surfaces of the trailer 310 such as to capture an area that encompasses 360 degrees surrounding the trailer 310. For example, the sensors may be located on a rear exterior surface of the trailer 310, on the roof of the trailer 310, or above the rear wheels 330(*a*) and 330(*b*) of the trailer 310. In one approach, the sensors may capture an area that encompasses a desired parking position of the trailer 310. An occupant may input a requested parking position for the trailer 310 to park in using an input device (e.g., a touchpad). In response to receiving the requested parking position, the control module 220 controls the sensor system to acquire the sensor data 250 encompassing the requested parking position. The control module 220 displays the sensor data 250 on, for example, a display within the vehicle 100.

At 450, in response to receiving feedback from the trailer 310 indicating that the trailer 310 is within a requested position, the control module 220 sends a control signal to stop the trailer 310. In one approach, the control module 220 sends the stop signal to the trailer 310 automatically, based, at least in part, on determining that the trailer 310 is within the requested parking position such as, for example, between the boundaries of a parking space and is longitudinally centered between the boundaries of the parking space. The control module 220 may automatically send the stop signal to the trailer 310 if the trailer 310 begins to position in a matter that satisfies parking criteria defined by the trailer system 170. For example, the control module 220 can pre-emptively prepare a stop signal to send to the trailer 310 if the trailer 310 becomes positioned between the requested position, the requested position being between the boundaries of a parking space.

In one arrangement, the control module 220 compares attributes of the detected position of the trailer 310 with the parking criteria. As previously explained, the control module 220 can perform the comparison to identify whether the position of the trailer 310 satisfies basic characteristics (e.g., a magnitude of distance from the solid lines of a parking space) or can perform more complex analysis involving the identification of whether the trailer 310 is maneuvering in a manner that indicates it is approaching the requested parking position. In either case, the control module 220 compares the position of the trailer 310 against the parking criteria to identify whether the trailer 310 is in a requested parking position. As such, the control module 220 sends the control signal to stop the trailer 310 in response to determining that the position of the trailer 310 satisfies the parking criteria.

Alternatively, at 450, the control module 220 sends the control signal to stop the trailer 310 according to an electronic input from a machine interface controlled by a human driver of the vehicle 100. The machine interface may be an input device, where the input device communicates a disengagement request. For example, an occupant may press a button, interact with a touchpad, or interact with a remote device in a manner that indicates a request to disengage hitchless maneuvering. In one approach, a touchpad may have a virtual "stop" button that an occupant presses to generate the control signal to stop the trailer 310. In one arrangement, an occupant engages a "stop" button located in the interior of the vehicle 100 to generate the control signal to stop the trailer 310. In response to receiving the control signal to stop the trailer 310, the control module 220 sends a control signal to stop the trailer 310 from moving any farther. If, however, the control module 220 does not receive a control signal to stop the trailer 310, the control module 220 continues to identify and communicate control inputs as discussed at block 420. Otherwise, the control module 220 proceeds to halt operation.

Figure 5:
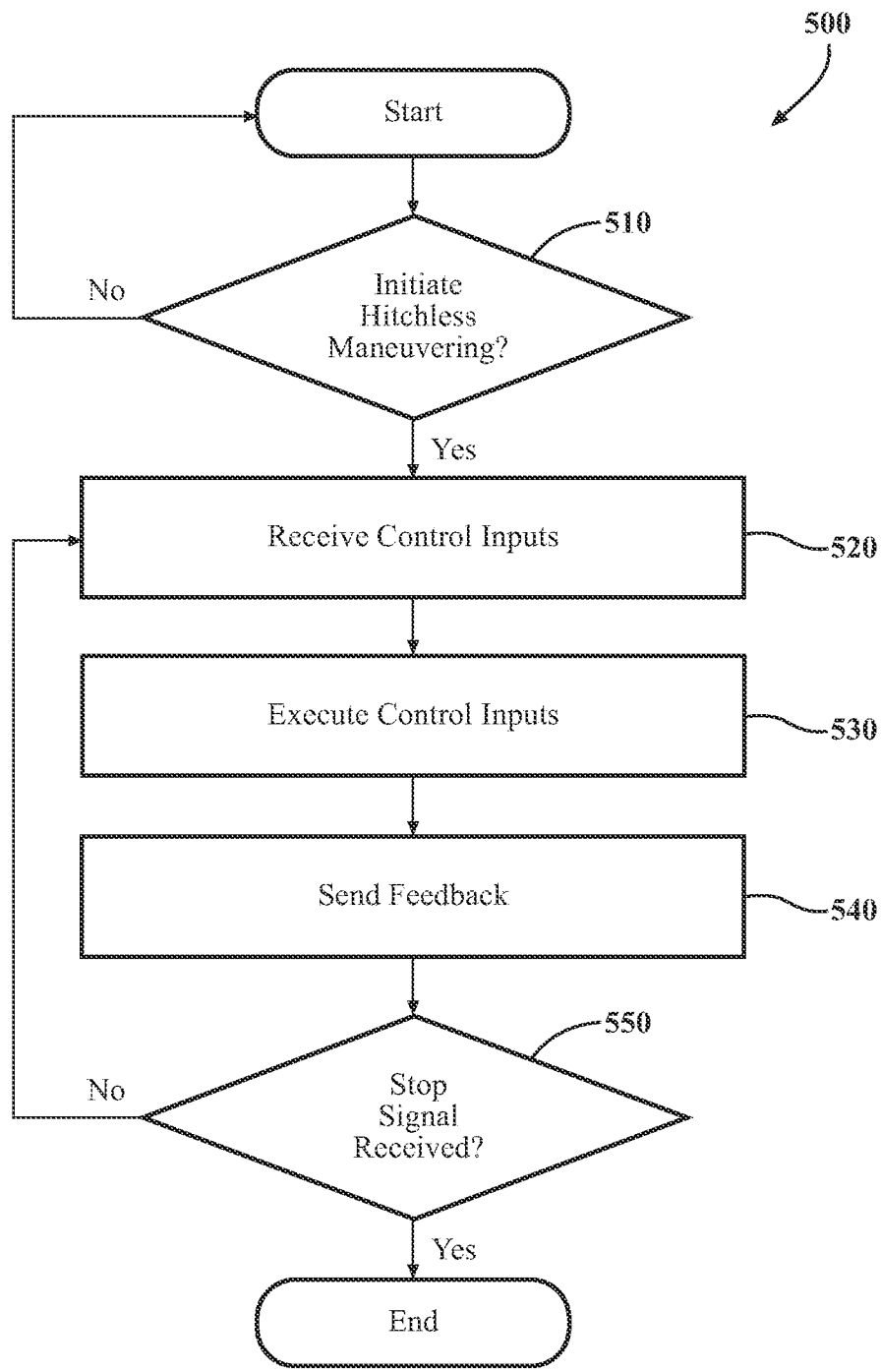
FIG. 5 is a flowchart illustrating one embodiment of a method associated with a trailer maneuvering based on vehicle controls.

FIG. 5 illustrates a flowchart of a method 500 that is associated with improving trailer control from within a vehicle. The method 500 will be discussed from the perspective of the trailer response system 350 of FIG. 3 as it responds to control inputs from the trailer system 170 of FIGS. 1 and 2.

At 510, as previously disclosed, the control module 220 receives a signal to initiate hitchless maneuvering of a trailer separately from a controlling vehicle. In one embodiment, the trailer is the trailer 310, and the controlling vehicle is the vehicle 100. At the same time, the trailer response module 360 receives the signal to initiate hitchless maneuvering of the trailer 310. In response to receiving the signal to initiate hitchless maneuvering of the trailer 310, the response module 360 transmits a beacon to set up a wireless connection with the vehicle 100. In response to transmitting the beacon, the response module 360 receives a secured message from the control module 220 which establishes the wireless connection.

Further, in response to receiving the signal to initiate hitchless maneuvering of the trailer 310, the response module 360 activates the mobility component 320 to facilitate trailer maneuvering. The mobility component may be, for example, a wheel, a gyroscope, or other device capable of facilitating movement. In one configuration, when the mobility component 320 is a wheel, the wheel functions in accordance with the rear wheels 320(a) and 330(b) and steers the trailer 310. In one arrangement, when the mobility component 320 is a gyroscope, the gyroscope balances the trailer 310 on the rear wheels 320(a) and 320(b). When the mobility component 320 is not activated, it may be stored, for example, in a retracted position on the undercarriage of the trailer 310. The mobility component 320 may include a telescoping support structure to facilitate movement of the mobility component 320. In one approach, the response module 360 controls electronic systems of the trailer 310 to cause the support structure of the mobility component 320 to extend the mobility component 320 from a retracted position to the ground.

At 520, the response module 360 receives control inputs from the control module 220. The control inputs may include, for example, speed controls, steering controls, and braking controls. The response module 360 translates control inputs into executable instructions that cause the trailer 310 to move in accordance with the control inputs. For example, the response module 360 may receive a left-turn steering control when an occupant enters a left-turn control input using an input device in the vehicle 100. The response module 360 translates the left-turn control input into a left-turn command for the trailer 310 to execute.

At 530, the response module 360 executes the control inputs. For example, if the response module 360 receives a left-turn steering control, the response module 360 controls a steering mechanism of the trailer 310 to cause the trailer 310 to steer to the left. In one embodiment, the response module 360 receives a left-turn steering control as well as a speed control. Accordingly, the response module 360 controls a steering mechanism and propulsion system of the trailer 310 to cause the trailer 310 to steer to the left and to accelerate at the speed corresponding to the speed control.

At 540, the response module 360 sends feedback to the trailer system 170. In one embodiment, the trailer response system 350 includes sensors such as, for example, cameras, that capture real-time image and video data surrounding the trailer 310. The sensors may be located on any exterior surface of the trailer 310 such as to capture an area that encompasses 360 degrees surrounding the trailer 310. In one configuration, the sensors may be located on a rear exterior surface of the trailer 310, on the roof of the trailer 310, or above the rear wheels 330(a) and 330(b) of the trailer 310. In one arrangement, the sensors capture an area that encompasses a requested parking position. For example, the sensors may capture real-time image and video data of the trailer 310 being within the boundaries of a parking space.

At 550, the response module 360 monitors the trailer response system 350 for a stop signal from the control module 220. If the response module 360 does not receive a stop signal from the control module 220, the response module 360 continues to receive and interpret control inputs, as discussed at block 520. Otherwise, the response module 360 proceeds to halt operation.

As a further explanation of how the trailer system 170 improves controlling the trailer 310 separately from the vehicle 100, an example of a parking sequence associated with a trailer being wirelessly maneuvered by a vehicle will now be discussed in relation to FIG. 6. At timestep 600, the vehicle 100 and the trailer 310 initiate hitchless maneuvering. Thus, as discussed previously, at 600, the vehicle 100 and trailer 310 establish a wireless connection and an existing physical connection between the vehicle 100 and the trailer 310 disconnects according to communications received from the control module 220.

At 610 the response module 360 executes control inputs from the control module 220 and, as shown in the example, begins reversing into a parking space. As illustrated, while the control module 220 communicates control inputs to the response module 360, the vehicle 100 remains stationary. In contrast, the trailer 310 moves in accordance with the communicated control inputs.

Figure 6:
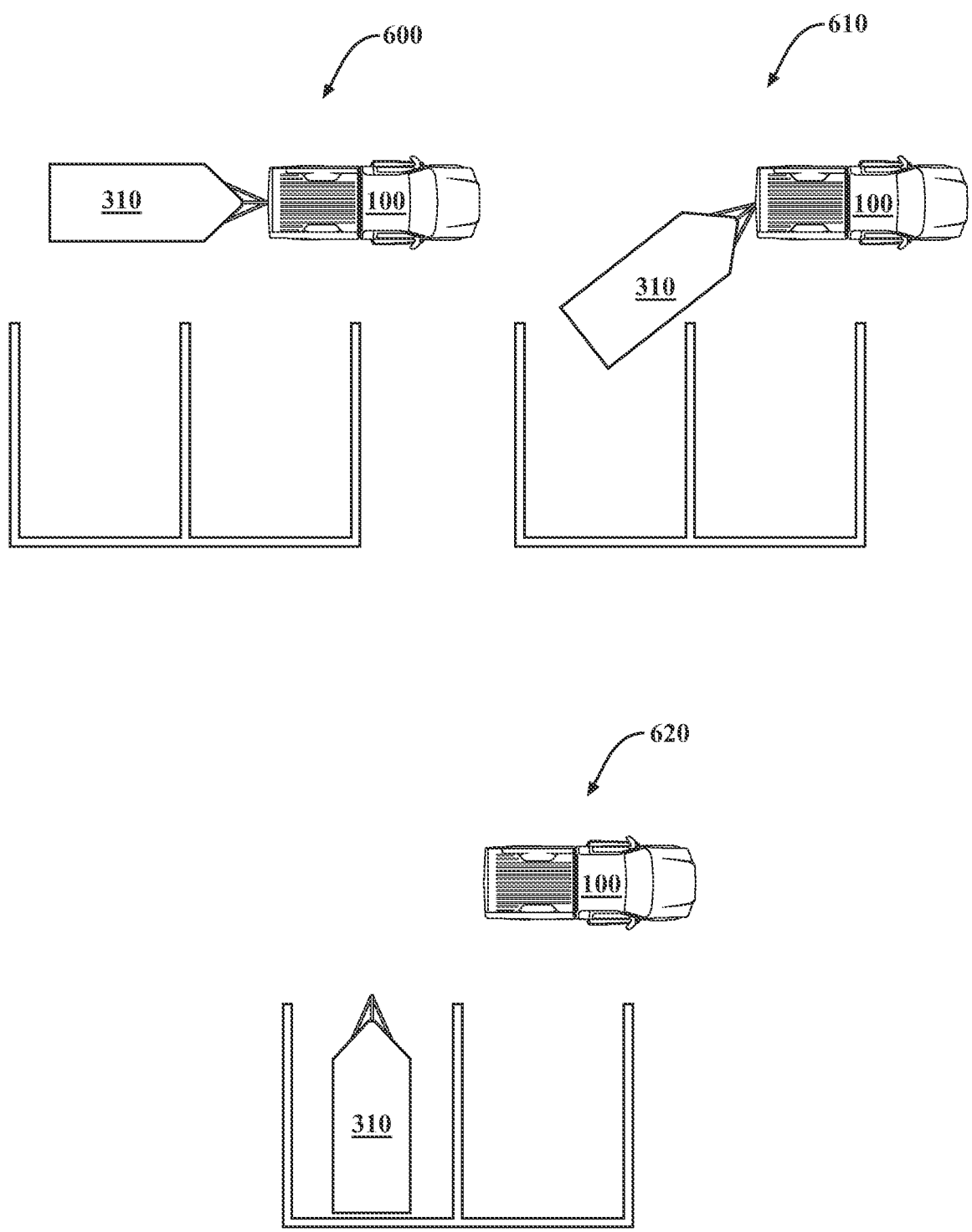
FIG. 6 illustrates a parking sequence associated with a trailer being wirelessly maneuvered by a vehicle.

FIG. 6 illustrates a subsequent time step at 620. At 620, the trailer 310 stops between the boundaries of a parking space. In one approach, the trailer 310 stops in response to receiving a stop signal from the vehicle 100. After receiving the stop signal, the control module 220 disconnects a wireless connection between the vehicle 100 and the trailer 310.

Figure 7:
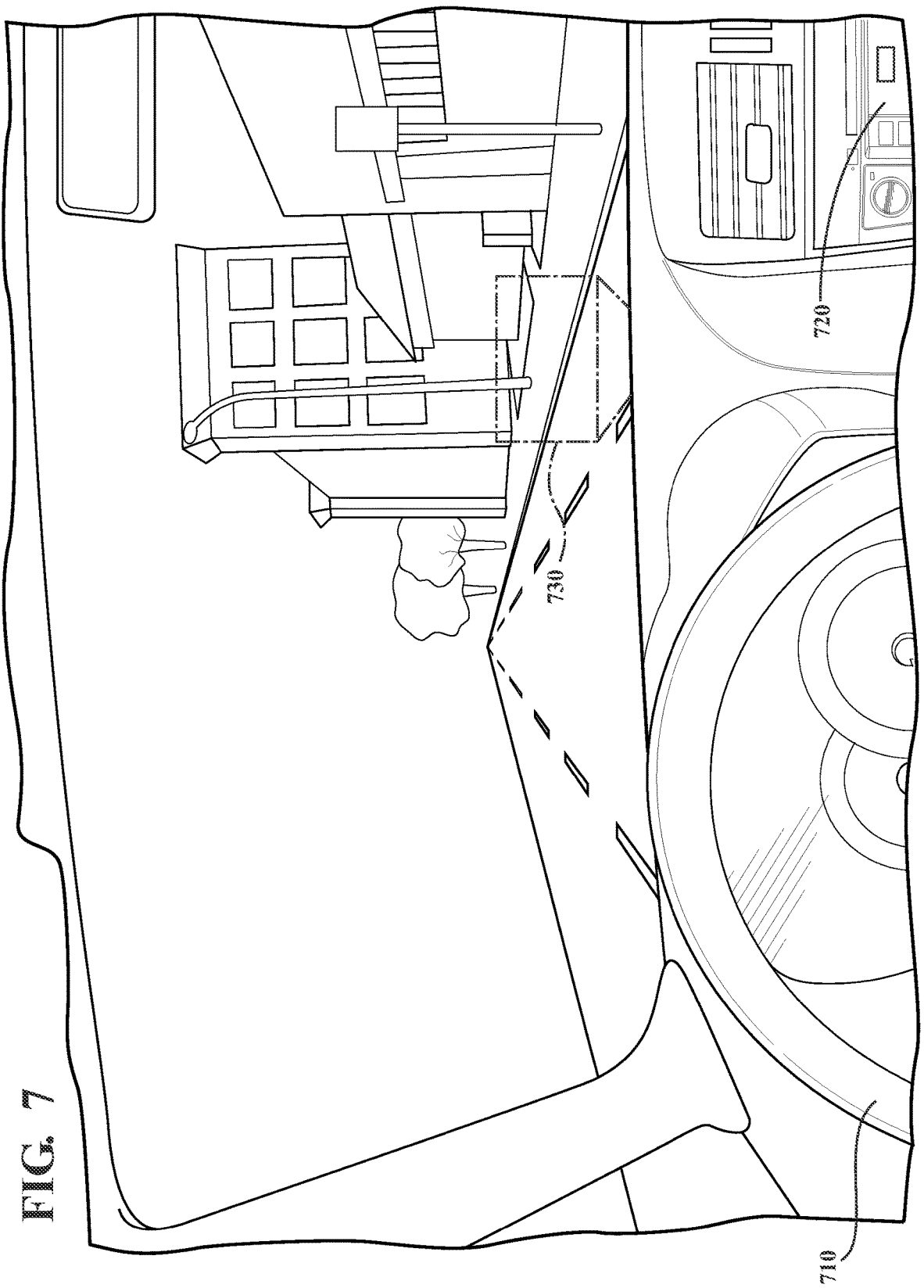
FIG. 7 illustrates an interior view of a vehicle, input devices used to control a trailer, and a display system of the vehicle.

As a further explanation of how the trailer system 170 identifies control inputs for controlling the trailer 310 and receives feedback from the trailer 310, an example interior view of the vehicle 100 will now be discussed in relation to FIG. 7. In various implementations, the vehicle 100 includes at least one machine interface. In one arrangement, the machine interface is a steering wheel 710. In one embodiment, the machine interface is a knob, button, or touchpad 720. In one configuration, the interior of the vehicle 100 includes a combination of the steering wheel 710, the knob, the button, and the touchpad 720 as machine interfaces. While the steering wheel 710, the knob, the button, and the touchpad 720 are shown as all being included in the vehicle 100, it will be understood that the embodiments herein are not limited to the configuration shown in FIG. 7.

Moreover, as disclosed herein, the vehicle 100 includes at least one display. FIG. 7 illustrates an exemplary display 730 for receiving feedback from the trailer 310. The display 730 shows real-time image and video data captured by sensors attached to the trailer 310. While the display 730 is shown as being a heads-up display (HUD), it will be understood that the display 730 may be any display installed in the vehicle 100 including an augmented reality (AR) display. The display 730 informs subsequent trailer maneuvers for an occupant of the vehicle 100.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and application specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the trailer system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the trailer system 170, and/or the autonomous driving module(s) 160 may control some or all of the vehicle systems 140 and, thus, may be partially or fully autonomous as defined by SAE 0 to 5.

The processor(s) 110, the trailer system 170, and/or the autonomous driving module(s) 160 can be operatively connected to communicate with the various vehicle systems 140 and/or individual components thereof. For example, returning to FIG. 1, the processor(s) 110, the trailer system 170, and/or the autonomous driving module(s) 160 can be in communication to send and/or receive information from the various vehicle systems 140 to control the movement. of the vehicle 100. The processor(s) 110, the trailer system 170, and/or the autonomous driving module(s) 160 may control some or all of the vehicle systems 140.

The processor(s) 110, the trailer system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the trailer system 170, and/or the autonomous driving module(s) 160 can control the direction and/or speed of the vehicle 100. The processor(s) 110, the trailer system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof to responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the trailer system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the control module 220. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
one or more processors;
a memory communicably coupled to the one or more processors and storing:
a control module including instructions that when executed by the one or more processors cause the one or more processors to:
in response to receiving a signal to initiate hitchless maneuvering of a trailer separately from a controlling vehicle:
cause a physical connection between the trailer and the controlling vehicle to disconnect,
responsive to the disconnect, transmit a signal to cause the trailer to activate a mobility component for maneuvering the trailer independent of the controlling vehicle, the mobility component including a gyroscope that balances the trailer on rear wheels,
disable control connections of input devices within the controlling vehicle that maneuver the controlling vehicle, and
enable remote control of the trailer using the input devices within the controlling vehicle;
acquire control inputs to maneuver the trailer from the input devices within the controlling vehicle;
communicate, from the controlling vehicle to the trailer, the control inputs to maneuver the trailer; and
in response to receiving feedback from the trailer indicating the trailer is within a requested position, send a control signal to stop the trailer.

2. The system of claim 1, wherein the control module includes instructions to communicate the control inputs while the controlling vehicle remains in a stationary position.

3. The system of claim 1, wherein the control module includes instructions to generate the control signal according to one of: an electronic input from a machine interface controlled by a human driver and automatically based, at least in part, on determining the trailer is within the requested position.

4. The system of claim 1, wherein the control inputs to maneuver the trailer include control inputs to maneuver the trailer in at least a longitudinal direction.

5. The system of claim 1, wherein the feedback is at least one of: video data and image data of the trailer; and
the control module includes instructions to display the at least one of the video data and the image data of the trailer on a display located within the controlling vehicle.

6. The system of claim 1, wherein the input devices include a steering wheel, a brake pedal, and an accelerator pedal.

7. The system of claim 1, wherein the control inputs include at least one of speed controls, braking controls, and steering controls.

8. The system of claim 1, wherein the requested position is a position in between markings indicating a parking space.

9. A non-transitory computer-readable medium including instructions that when executed by one or more processors cause the one or more processors to:
responsive to receiving a signal to initiate hitchless maneuvering of a trailer separately from a controlling vehicle:
cause a physical connection between the trailer and the controlling vehicle to disconnect,
responsive to the disconnect, transmit a signal to cause the trailer to activate a mobility component for maneuvering the trailer independent of the controlling vehicle, the mobility component including a gyroscope that balances the trailer on rear wheels,
disable control connections of input devices within the controlling vehicle that maneuver the controlling vehicle, and
enable remote control of the trailer using the input devices within the controlling vehicle;
acquire control inputs to maneuver the trailer from the input devices within the controlling vehicle;
communicate, from the controlling vehicle to the trailer, the control inputs to maneuver the trailer; and
responsive to receiving feedback from the trailer indicating the trailer is within a requested position, send a control signal to stop the trailer.

10. The non-transitory computer-readable medium of claim 9, wherein the instructions to communicate the control inputs to the trailer include instructions to communicate the control inputs while the controlling vehicle remains in a stationary position.

11. The non-transitory computer-readable medium of claim 9, wherein the instructions to send the control signal to stop the trailer include instructions to generate the control signal according to one of: an electronic input from a machine interfaced controlled by a human driver and automatically based, at least in part, on determining the trailer is within the requested position.

12. The non-transitory computer-readable medium of claim 9, wherein the instructions to acquire the control inputs to maneuver the trailer include instructions to acquire the control inputs to maneuver the trailer in at least a longitudinal direction.

13. The non-transitory computer-readable medium of claim 9, wherein receiving the feedback includes receiving at least one of: video data and image data of the trailer; and
wherein the non-transitory computer-readable medium includes instructions to display the at least one of the video data and the image data of the trailer on a display located within the vehicle.

14. A method, comprising:
in response to receiving a signal to initiate hitchless maneuvering of a trailer separately from a controlling vehicle:
causing a physical connection between the trailer and the controlling vehicle to disconnect,
responsive to the disconnect, transmitting a signal to cause the trailer to activate a mobility component for maneuvering the trailer independent of the controlling vehicle, the mobility component including a gyroscope that balances the trailer on rear wheels,
disabling control connections of input devices within the controlling vehicle that maneuver the controlling vehicle, and
enabling remote control of the trailer using the input devices within the controlling vehicle;
acquiring control inputs to maneuver the trailer from the input devices within the controlling vehicle;
communicating, from the controlling vehicle to the trailer, the control inputs to maneuver the trailer; and
in response to receiving feedback from the trailer indicating the trailer is within a requested position, sending a control signal to stop the trailer.

15. The method of claim 14, wherein communicating the control inputs to the trailer includes communicating the control inputs while the controlling vehicle remains in a stationary position and, wherein transmitting the signal to cause the mobility component to activate further includes rendering the control vehicle stationary by automatically engaging a park function of the controlling vehicle.

16. The method of claim 14, wherein sending the control signal to stop the trailer includes generating the control signal according to one of: an electronic input from a machine interface controlled by a human driver and automatically based, at least in part, on determining the trailer is within the requested position.

17. The method of claim 14, wherein acquiring the control inputs to maneuver the trailer includes acquiring the control inputs to maneuver the trailer in at least a longitudinal direction.

18. The method of claim 14, wherein receiving the feedback includes receiving at least one of: video data and image data of the trailer; and
displaying the at least one of the video data and the image data of the trailer on a display located within the controlling vehicle.

19. The method of claim 14, wherein acquiring the control inputs to maneuver the trailer includes acquiring the control inputs from a steering wheel a brake pedal, and an accelerator pedal.

20. The method of claim 14, wherein acquiring the control inputs includes acquiring at least one of speed controls, braking controls, and steering controls.

* * * * *